United States Patent [19]

Housas

[11] Patent Number: 4,789,167
[45] Date of Patent: Dec. 6, 1988

[54] PIPE GASKET WITH REINFORCING MEANS IN ITS BASE SELF-ENERGIZING

[75] Inventor: Jim Housas, Stow, Ohio

[73] Assignee: Hamilton Kent Manufacturing, Inc., Houston, Tex.

[21] Appl. No.: 17,067

[22] Filed: Feb. 20, 1987

[51] Int. Cl.⁴ ............................................. F16J 15/32
[52] U.S. Cl. .................................. 277/207 A; 277/166; 277/205; 277/207 R; 285/110; 285/379
[58] Field of Search .................. 277/166, 205, 207 R, 277/207 A, 207 B, DIG. 2; 285/110, 111, 379

[56] References Cited

U.S. PATENT DOCUMENTS

| | | | |
|---|---|---|---|
| 3,173,694 | 3/1965 | Nathan | 277/1 |
| 3,386,745 | 6/1968 | Hein | 277/168 |
| 4,362,323 | 12/1982 | Lodder et al. | 285/231 X |
| 4,487,421 | 12/1984 | Housas et al. | 277/207 A |

FOREIGN PATENT DOCUMENTS 3226875 9/1984 Fed. Rep. of Germany ... 277/207 A

OTHER PUBLICATIONS

Hamilton Kent of Ohio catalog, ©1986, H. K. Mfg., 6 pages.

Primary Examiner—Robert S. Ward
Attorney, Agent, or Firm—Lorusso & Loud

[57] ABSTRACT

A self-energizing pipe gasket includes a base and arm configuration projecting therefrom which cooperates with the base when pipe sections are assembled to cause the lip or sealing edge of the arm to kick away or distend towards the sealing surface of the pipe. To facilitate this action a harder insert is provided in the base in the form of a reinforcing ring providing a less compressible surface for the arm to react against. The ring also stiffens the gasket making it more difficult to dislodge upon assembly of the pipe sections enabling higher compression forces and assuring that the gasket does not go under or below the minimal compression requirements to form a sound flexible yet fluid tight seal. In one embodiment a raised portion of the arm is manufactured in contact with a surface of the base and in another embodiment the gasket includes two symmetrical arms each of which includes four surfaces.

11 Claims, 1 Drawing Sheet

PIPE GASKET WITH REINFORCING MEANS IN ITS BASE SELF-ENERGIZING

BACKGROUND OF THE INVENTION

The present invention relates to pipe gaskets for sealing a bell and spigot pipe connection. Specifically the present invention relates to a gasket having a base and a sealing lip which is pressed against the base to form a tight seal by mechanical interaction between the base and the arm.

Pipes used for water supply lines or sewage lines frequently have a bell at one end which receives the spigot of an adjacent section of pipe. Typically, in plastic pipe the bell includes an internal, annular recess in which a gasket is placed to seal the joint between the bell and spigot. The gasket must not only make an effective seal, it must also be relatively simple to install and must retain itself in the recess in the bell, and it must allow the spigot to be inserted relatively easily.

In some environments in which these pipe gaskets are used, a considerable amount of debris exists. Frequently, this debris lodges between the arm and the base of the gasket thereby weakening the seal provided by the gasket.

Additionally, it is also desirable to have a gasket which can be inserted in either direction and still operate properly, as in the case of prior art symmetrical gaskets.

It is therefore a principal object of the present invention to provide a self-energizing pipe gasket that includes a base and an arm configuration which prevents debris from lodging between the base and the arm prior to insertion of a spigot.

It is another principal object of the present invention to provide an improved self-energizing pipe gasket which can be inserted in either direction and which will provide a reliable and enduring seal.

SUMMARY OF THE INVENTION

The pipe gasket of the present invention includes a reinforcing means in its base that provides a self-energizing seal. The gasket includes an annular base portion which is shaped to fit a recess in a pipe bell or against the shoulder of a spigot. An arm extends from the base around its entire perimeter and it is inclined away from the open end of the bell or spigot. The arm terminates in the sealing lip which seals against the outside of the spigot or the inside of the bell inserted on a spigot. As the spigot is inserted, the arm is bent over rocking on a raised fulcrum part of the base or arm, and the sealing lip of the arm is thereby kicked toward or pressed against the spigot or bell. The action at the fulcrum is enhanced by a reinforcing ring which is disposed in a recess in the base to reduce the compressibility of the base in the region of the fulcrum. The ring is made of a plastic or metal material which is relatively hard and has a greater tensile strength than the material of which the remainder of the base is constructed.

In one embodiment of the present invention, the arm is shaped to cooperate with a raised fulcrum portion of the base so that when the gasket is installed in a groove, the arm and the raised fulcrum contact each other before a spigot is inserted in order to prevent foreign debris from entering the inner void area formed between the arm and the base. In an alternate embodiment, a pair of symmetrical arms extend from the base of the gasket and the single reinforcing ring is disposed at the axial midline of the gasket.

DETAILED DESCRIPTION OF THE PREFERRED EMBODIMENTS

Figure 2:
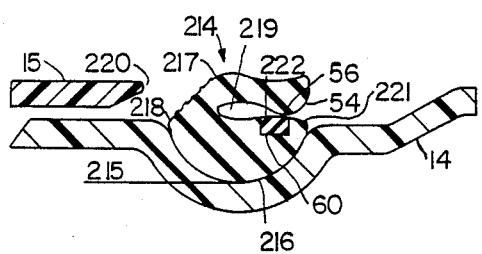
FIG. 2 is a cross sectional view of a gasket of the present invention installed in a recess in the bell of a pipe.

FIG. 2 illustrates a gasket 214 the major diameter surface contour 215 of which is formed to abut to the radial groove contour 216 of the bell 14, and is designed for various nominal diameter sizes.

The leading edge 218 of the major diameter radial base 215 of gasket 214 terminates in an extended radius apex. The radius apex 218 prevents gasket 214 from snagging the leading male tip 220 of the spigot 15, so that the extended radius apex 218 of the gasket 214 serves as a guide for the entry of the spigot 15.

The arm 217 and ring 60 illustrated in FIG. 2, are similar to the arm and ring of prior art gaskets and operate in a similar manner. However, unlike prior art gasket arms, the arm 217 illustrated in FIG. 2 is shaped so that the projecting fulcrum 54 is in contact with the raised fulcrum 56 of the base. Thus, when the gasket 214 is installed in the radial groove 216 of the bell 14, the fulcrum 54 of the arm 217 and the raised fulcrum 56 slightly constrict against each other. As a result, this gasket 214 prevents foreign debris from entering the radial inner void area 219 of the gasket 214.

The trailing edge of the gasket 214 ends in the form of a radius apex like lip 221, and the flush surface 222 provides additional means of landing for arm 217 when spigot 15 is forced into the pipe's bell 14.

The arm 217 of the gasket 214 and the ring 60 can also be constructed in shapes similar to those used in prior art gaskets.

Figure 3:
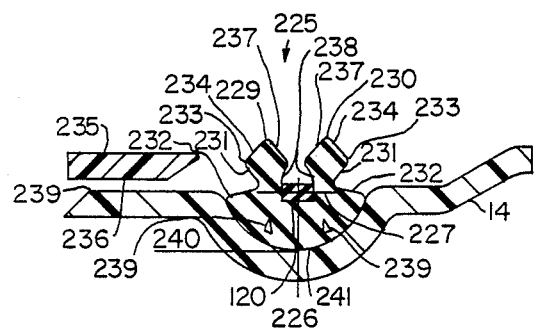
FIG. 3 is a cross sectional view of another embodiment of the gasket of the present invention.

FIG. 3 illustrates an alternate symmetrical embodiment of the gasket of the present invention. The gasket 225 when viewed from its intervening axis 226 has a mirror image like construction that insures that gasket 225 is not installed in a backward manner. In other words, as with prior art symmetrical gaskets the operational principles are the same regardless of the position of the gasket as placed in the recess.

The gasket 225 is provided with a single reinforcing ring 120 disposed at the axial midline 227 of the gasket 225. A pair of symmetrical arms 229, 230 extend from the minor diameter of the gasket 225. The lower leading surface 231 of each of the arms 229, 230 is inclined at an angle to the outer surface 232 of the gasket 225.

When the spigot 235 is inserted into the inside surface 239 of the bell 236 with the gasket 225 installed as shown in FIG. 3, the arm 229 is bent to the right with the annular intersection 233 of surfaces 231, 234 forming a sealing point which bears against the outside surface 236 of the spigot 235. This sealing intersection point 233 is forced radially outward by the reinforcing ring 226 which applies a perpendicular compression force to the upper inner surface 237 of the arm 229. Thus when the lower inner surface 238 of the arm 229 is forced to press on reinforcing ring 226, a compression load is generated and acts as a primary means of sealing.

When the spigot 235 contacts the inner upper surface 234 of the arm 230, bending action takes place. The outside surface 236 of the spigot 235 constricts the outer lower surface 231 of the arm 230 towards the outer surface 232 of the gasket 225. A pair of symmetrical hollow cavities 239 facilitate the flexing and bending or arms 229, 230 by permitting the area of the base in which the holes are situated to compress to a greater degree.

The major diameter radial surface contour 240 of the gasket 225 shown in FIG. 3 is shaped to match the radial groove 241 of the bell 14. But the major diameter surface contour 239 of the gasket can be extruded to match various bell groove configurations.

Figure 1:
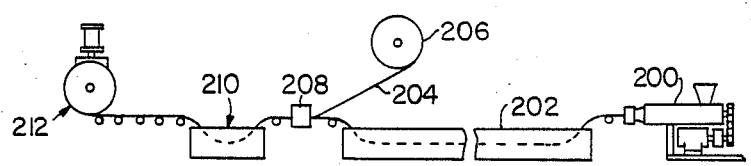
FIG. 1 is a shematic illustration of an apparatus for making gaskets in accordance with the present invention.

FIG. 1 illustrates an apparatus for manufacturing gaskets in accordance with the present invention. An extruder 200 extrudes a resilient rubber material to form a continuous strip having the cross section shown, for example in FIG. 2. This material may be rubber, neoprene, etc. After extrusion, the rubber material is fed through various baths and treatments to cure or vulcanize it as shown at 202. Thereafter a continuous strand 204 of plastic or wire in the shape of the ring is fed from a spool 206 and inserted into the recess, e.g. 60 (FIG. 2) by a threadng or inserting mechanism 208. The continuous strip of gasket is then cooled by cooling baths 210 before being fed to a continuous coiling machine 212. The machine 212 recieves the continuous strip of gasket material and coils it into a helical coil of a predetermined and exact diameter. Thereafter, the coil is cut lengthwise severing each turn of the helix one time to form a plurality of segments each of the same length. Each segment is then joined to itself in conventional manner to form an annular gasket of the desired diameter. It will, of course, be appreciated that pre-cut lenths of wire or plastic strand may be hand inserted into pre-cut lengths of gasket before or after circularization and joining.

Thus it is clear that the present invention provides an improved gasket which includes a plastic or wire reinforcing ring in its base to limit compressibility of the base in the region where the arm is pressed against the base. The gasket constructed in accordance with the present invention seals more tightly than most prior art gaskets and retains its position in the recess of the bell of a pipe, or against the shoulder of a spigot, more securely than most prior art gaskets while ensuring that the compression of the gasket is above the minimal compression requirements to form a sound fluid tight seal.

As indicated, the gasket is formed of a softer material such as rubber, neoprene or an elastomer, while the ring may be formed of a hard plastic, such as polypropylene, or a metal such as an alloy of copper or steel.

While the foregoing invention has been described with reference to the preferred embodiments, various alterations and modifications will occur to those skilled in the art. All such alterations and modifications are intended to fall within the scope of the appended claims.

What is claimed is:

1. A gasket for use in sealing a telescopic connection between two pipes, said gasket comprising
   a compressible base adapted to be received by one of a pair of telescoping pipes,
   an arm connected with and extending from said base and terminating in a sealing lip which curves away from said base and includes a raised portion which contacts a top surface of said base at an end of said top surface opposite the location on said top surface from which said arm extends, said arm and base forming a void therebetween which is sealed by the contact of said raised portion of said arm and said base, said arm being adapted to engage the other of said pair of telescoping pipes, said base having a surface adapted to engage said arm between said connection with said base and said lip upon telescoping of the pipes together to press said lip against the other of said pipes; and
   reinforcing means in said base to reduce the compressibility of said base in the area of said surface.

2. The gasket of claim 1, said compressible base being formed of rubber or like material.

3. The gasket of claim 1 wherein said reinforcing means includes an annular ring of harder material than said base.

4. The gasket of claim 3 wherein said annular ring is received in a recess in said base.

5. The gasket of claim 4 wherein said annular ring has a rectangular cross-section.

6. The gasket of claim 5 wherein said recess in said base encloses three sides of said ring.

7. The gasket of claim 4 wherein said ring has a circular cross-section.

8. The gasket of claim 1 further comprising means for facilitating bending of said arm with respect to said base, including a hollow within said gasket.

9. The gasket of claim 8 wherein said hollow is defined entirely by surfaces of said base.

10. The gasket of claim 8 wherein said hollow is defined cooperatively by a surface of said base and a surface of said arm.

11. The gasket of claim 3 adapted to be received in an annular recess circumscribing a pipe, said ring having a diameter between the major and minor diameters of said recess.

* * * * *